United States Patent
Arethens

(10) Patent No.: US 6,169,957 B1
(45) Date of Patent: Jan. 2, 2001

(54) SATELLITE SIGNAL RECEIVER WITH SPEED COMPUTING INTEGRITY CONTROL

(75) Inventor: Jean-Pierre Arethens, Beaumont les Valence (FR)

(73) Assignee: Sextant Avionique, Velizy Villacoublay (FR)

(*) Notice: Under 35 U.S.C. 154(b), the term of this patent shall be extended for 0 days.

(21) Appl. No.: 09/147,333

(22) PCT Filed: Jun. 3, 1997

(86) PCT No.: PCT/FR97/00966

§ 371 Date: Dec. 4, 1998

§ 102(e) Date: Dec. 4, 1998

(87) PCT Pub. No.: WO97/47983

PCT Pub. Date: Dec. 18, 1997

(30) Foreign Application Priority Data

Jun. 7, 1996 (FR) .................................................. 96 07072

(51) Int. Cl.[7] ...................................................... G01S 1/02
(52) U.S. Cl. ...................................... 701/213; 342/357.02
(58) Field of Search ................................ 701/200, 207, 701/213, 214, 215; 342/31, 36, 37, 357.02, 357.03, 357.04, 357.06, 357.12

(56) References Cited

U.S. PATENT DOCUMENTS

| 5,347,546 | * | 9/1994 | Abadi et al. | 342/357.12 |
| 5,436,632 | * | 7/1995 | Sheynblat | 342/357.03 |
| 5,504,492 | * | 4/1996 | Class et al. | 342/357.06 |

OTHER PUBLICATIONS

Y.C. Lee, Receiver Autonomons Integrity Monitoring (RAIM) Capability for Sole–Means GPS Navigation in the Oceanic Phase of Flight, IEEE XP000344339 pp. 464–472, Jan. 1992.*

* cited by examiner

Primary Examiner—William A. Cuchlinski, Jr.
Assistant Examiner—Edward Pipala
(74) Attorney, Agent, or Firm—Oblon, Spivak, McClelland, Maier & Neustadt, P.C.

(57) ABSTRACT

A satellite positioning receiver with velocity calculation integrity check. In order to increase the reliability of the velocity measurements by the receiver, it is proposed to measure the divergence between the measurements taken on n satellite director axes (n>4) and to given an alarm if this divergence exceeds a predetermined threshold. The divergence is measured by the mean square error between the calculated velocity vector and the velocities as measured along the director axes and projected on to the calculated velocity vector.

13 Claims, 1 Drawing Sheet

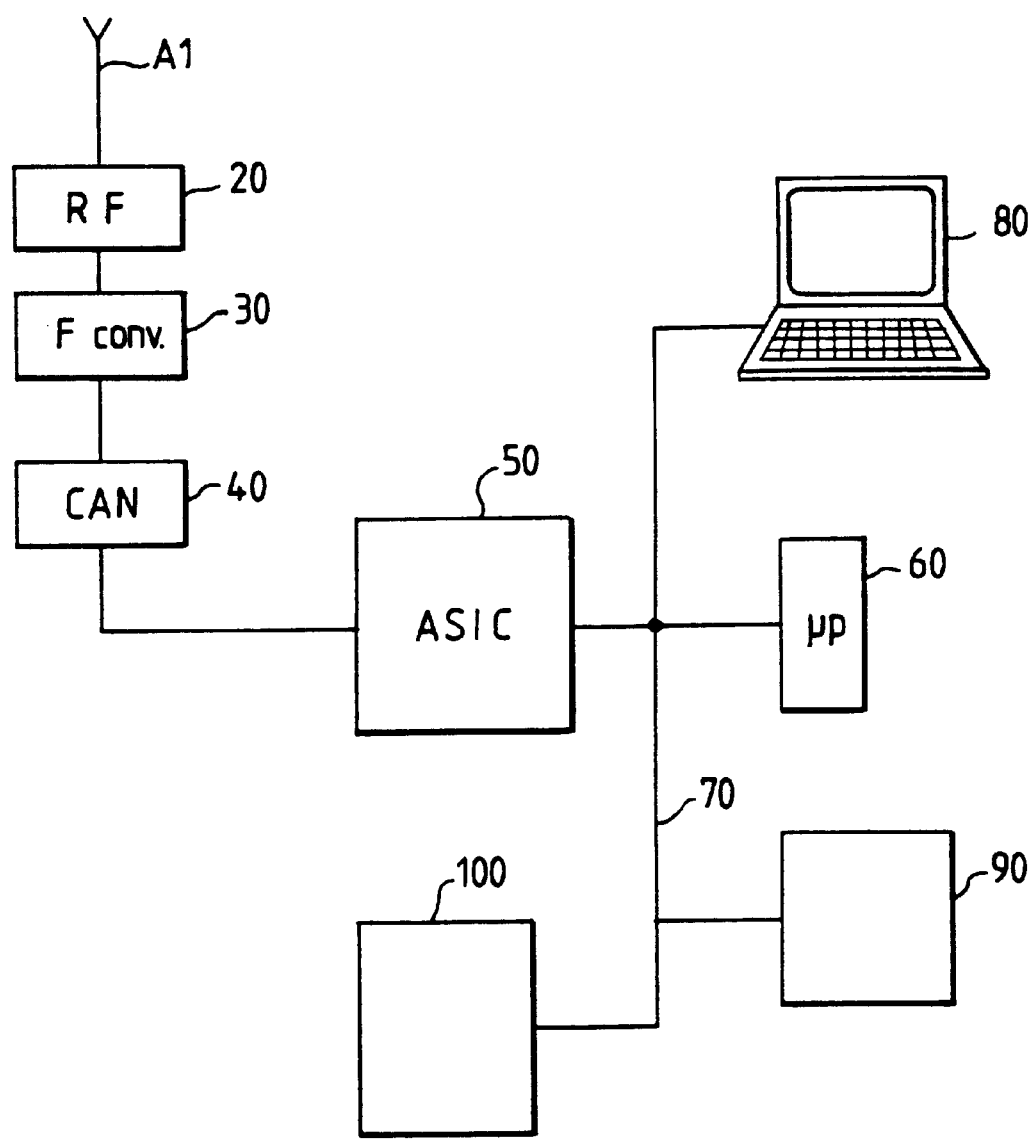

SATELLITE SIGNAL RECEIVER WITH SPEED COMPUTING INTEGRITY CONTROL

BACKGROUND OF THE INVENTION

1. Field of the Invention

The invention relates to satellite positioning receivers such as GPS (Global Positioning System) receivers.

2. Discussion of the Background

The GPS system uses a constellation of satellites which move around the earth on very precisely determined orbits, that is to say it is possible to know the position of an arbitrary satellite at any time. The satellites transmit radiofrequency signals, containing navigation data and codes which make it possible to identify each satellite. These codes phase modulate a carrier frequency. A GPS receiver, on the ground or on a land, air or sea vehicle, can receive the signals from several satellites simultaneously, precisely calculate its distance from each of the satellites, and deduce therefrom its precise position in latitude, longitude and altitude in a terrestrial frame. It can also deduce therefrom the precise date and time of the reception in the time frame of the GPS system. It can lastly deduce therefrom, by Doppler measurements, its own velocity vector in the terrestrial frame (the case of a receiver mounted on a moving vehicle).

In the GPS system, each satellite is identified by a pseudo-random code which is individual to it and repetitively (for example every millisecond) modulates a carrier frequency which the satellite transmits. There are systems similar to GPS, in particular the GLONASS system, in which this pseudo-random code also exists even though it is not used to identify individual satellites. The invention which will be described is directly applicable to the GLONASS system, but for the sake of simplicity reference will be made below only to the GPS system, and more precisely the "civil" part of the GPS system which also has a military part.

The pseudo-random code is a long code (1023 bits at 1.023 MHz, i.e. 1 millisecond), and one of its main functions is to make it possible to extract the satellite's signal from a noise level much higher (for example 30 dB) than the level of the signal. This technique is now widely known as spread spectrum transmission. The signal is extracted from the noise using an operation, in the receiver, of correlation between the received signal and a periodic pseudo-random code which is identical to the one expected to be found in the signal. If the codes do not coincide temporally, there is no correlation between the received signals and the local code generated by a local code generator; if they almost coincide, there is some degree of correlation, the correlation energy becoming stronger as the coincidence becomes more exact. It is therefore possible to establish a correlation signal making it possible to slave a local code generator until exact coincidence is obtained between the local code and the code modulating the signal which the satellite transmits. A code slaving loop then makes it possible to maintain this coincidence.

The pseudo-random code is transmitted by the satellite at extremely precise times which are known at the receiver. Use is made of the correlation operation to determine the arrival time of this code in the receiver: the characteristic time or epoch of transmission of the local code is determined, and since this local code coincides with the received code when the maximum correlation is established, this time represents the arrival time of the received code. The difference between a time at which the code is transmitted via the satellite and a time at which the code is received by the receiver makes it possible to determine a propagation time of the signals between the satellite and the receiver. Knowing that the propagation velocity of the signals is the velocity of light, the distance between the receiver and a given satellite can be calculated. The same operation performed on two other satellites makes it possible, by triangulation, to determine the exact position of the receiver relative to the three satellites.

By using a fourth satellite, the clock errors of the receiver are eliminated, the clock of the receiver not being as precise as that of the satellites. Further to the position of the receiver, it is then possible to calculate a precise time for the position measurement, in the time frame of the GPS satellites.

The position of each of the satellites is known at any time: it is calculated from tables which are stored in the receiver and are updated by the navigation message broadcast by the satellites. The velocity of the satellites at any time can also be calculated on the basis of these tables.

It is possible to determine, on the basis of the signals sent by four satellites, the time and the position of the receiver relative to the four satellites. Furthermore, by changing co-ordinates, the position of the receiver in a fixed terrestrial frame is obtained.

Similarly, the velocity of the receiver is calculated on the basis of a Doppler-effect measurement on the carrier frequency of the radiofrequency signal sent by the satellites. It is therefore possible to calculate the relative velocity of the receiver with respect to each of the satellites, along the director axis which joins this satellite to the receiver. Four satellites are needed to eliminate the time ambiguity. Four different relative velocity vectors are obtained, along the director axes joining the receiver to the four satellites. Simple calculations make it possible to determine the temporal drift of the clock of the receiver relative to the GPS time, and the velocity of the receiver along three axes in the terrestrial frame on the basis of these four velocity vectors and the following information:

the directions of the receiver-satellite director axes with respect to a fixed terrestrial frame (longitude, latitude, altitude); these directions are themselves obtained by knowledge of the position of the receiver at a given time and the position of each satellite at the same time;

the individual velocities of the satellites in the terrestrial frame at this time.

However, if more than four satellites are used, redundant information is obtained. This is the case for the professional-quality receivers used, in particular, in aeronautics.

If using all the redundant information led exactly to the same velocity calculation results, it would be possible to make do with taking any four satellites from the satellites in the constellation observed at a given time.

However, the measurements are affected by various imprecisions, so that the redundancy is not perfect. Furthermore, a satellite may be operating defectively at a given time and therefore give aberrant information interfering with the velocity determination.

In certain applications of GPS receivers, it may be important to determine the velocity with precision and certainty. This is the case, for example, for receivers used to assist in the landing of aircraft.

SUMMARY OF THE INVENTION

This is why the present invention proposes to calculate the relative velocity between the receiver and the satellites using more than four satellites, to deduce information about the integrity of the calculated velocity from the various measurements, and to give an indication of the fact that the measurement is not valid if the integrity of the velocity measurement is not satisfactory.

The term "integrity" of the measurement is intended to mean a quantity which represents the variable compatibility of the measurements taken on a set of more than four satellites, that is to say which represents the extent to which the velocity measurements obtained by taking one group of four satellites among n are identical with the velocity measurements obtained by choosing other groups of four satellites among the n.

More precisely, the invention proposes a satellite positioning receiver, comprising position calculation means which simultaneously use a number of n satellites at least equal to 4, receiver velocity calculation means which can determine the velocity of the receiver along the director axes joining the receiver to each of the n satellites, and means for calculating a velocity vector of the receiver in a fixed terrestrial frame on the basis of the velocities along the director axes and on the basis of a matrix of vectors representing the directions of these director axes in the fixed frame, this receiver being characterized in that it furthermore comprises means for calculating a value representative of the divergence between the velocity measurements and the n director axes, this value representing information about the validity of the velocity vector of the receiver in the fixed frame.

If the integrity is not sufficient, that is to say if the measurement of the divergence exceeds a determined threshold, the receiver may give an indication that the measurement is invalid, but may also initiate a search for the satellite which has caused an abnormal divergence, and temporary elimination of this satellite.

Preferably, the quantity which represents the divergence, or lack of integrity, is a residue $\Delta V$ equal to the norm of a vector which is the product $S \cdot VD$, where $S$ is an $n \times n$ matrix defined below, n being the number of satellites used and VD being a measured velocity vector whose components are the n velocity measurements along the director axes between the receiver and each of the n satellites; the matrix S is calculated on the basis of the following formula, where H is the director cosine matrix, that is to say an $n \times 4$ matrix representing the directions of the director axes in a fixed terrestrial spatio-temporal frame; $H^T$ is the transpose of this matrix, and I is the $n \times n$ identity matrix:

$$S = I - H(H^T \cdot H)^{-1} \cdot H^T.$$

The norm of the matrix product $S \cdot VD$ is $\Delta V = (|S \cdot VD|)^2$.

The integrity threshold is preferably selected on the basis of a false alarm probability value acceptable in the application in question. This threshold depends on the number of satellites used.

The quantity which represents the divergence and which is compared with a threshold is preferably a quantity normalized with respect to an estimated measurement noise of energy $\sigma^2$. In this case, the calculated residue is the normalized residue $\Delta V_{nr} = \Delta V / \sigma^2$.

The estimated noise may be a fixed value selected a priori as a function of the application, or a value measured on the basis of all the velocity measurements taken previously. In one advantageous solution, a moving average of the ratio $\Delta V / n-4$ between the residue and the number $n-4$ of degrees of freedom in the velocity calculation is used as an estimate of the noise $\sigma^2$. The number of degrees of freedom represents the number of satellites used less the number of satellites strictly necessary for this calculation.

Means for calculating a velocity error limit, representing the quality of the integrity check made, are moreover provided. This limit is a maximum velocity error which the system has a probability PND of not detecting. In other words, it is a velocity error linked with a probability threshold selected such that, when a certain probability referred to as probability non-detection is picked, there is this probability of the system not seeing this velocity error.

This limit may be displayed for the user, or else if it exceeds a determined threshold it may be used to give an indication of lack of reliability in the velocity measurement.

Other characteristics and advantages of the invention will become apparent on reading the following detailed description which is given with reference to the appended drawings, in which the single FIGURE represents the overall structure of a GPS receiver in which the present invention may be implemented.

FIG. 1 gives a brief overview of the general principle of a GPS receiver. The receiver has a radiofrequency part, comprising an antenna A1, a radiofrequency amplifier 20 and various associated filtering circuits, frequency conversion circuits 30 and an analog to digital converter 40. The converter makes it possible to deliver relatively low-frequency digital signals intended to be processed in a digital signal processing circuit 50. This circuit is controlled by a microprocessor 60 and associated calculation and control software.

DETAILED DESCRIPTION OF THE PREFERRED EMBODIMENTS

The microprocessor 60 has two functions:

on the one hand, it works out digital data used by the digital signal processing circuit 50, on the basis of digital data delivered by this circuit; in particular, it performs numerical calculations necessary for the digital slaving loops present in the digital processing circuit 50;

and on the other hand it gives final results of position, time and velocity calculation to the user, that is to say either on a digital display screen or on a digital bus to other equipment which need the results.

It could clearly be possible to have two separate processes for performing these two functions. In the embodiment with a single microprocessor 60, a bus 70 has been represented for exchanges between the microprocessor 60, the processing circuit 50, an input/output peripheral 80, the working memories 90, and the program memories 100 which contain the programs needed for the microprocessor to function.

Very briefly, the digital signal processing circuit has either a single processing channel, with the information from the various satellites being multiplex-processed, or preferably several channels which each work in parallel on a determined satellite.

Each channel has a double slaving loop: carrier phase slaving and code phase slaving.

The carrier phase loop essentially uses a local oscillator with digital phase control, delivering a periodic (sawtooth) digital phase at a frequency corresponding to the transposed carrier frequency, taking into account the Doppler effect to which the carrier frequency broadcasted by a satellite is subjected. The Doppler effect is taken into account by the very fact of the existence of the slaving loops. The microprocessor 60 calculates a carrier phase error signal; this signal is used to control the local oscillator in order to slave a local carrier frequency to the carrier frequency received from the satellite.

The code phase slaving loop has a local code generator driven by an oscillator with digital phase control. It makes it possible to slave the local codes to the code received from the satellite and then to be able to determine the exact temporal position of the local codes thus slaved. The local code is correlated with the code received from the satellite; the correlation signal is calculated by the microprocessor and is used to slave the loop in order to bring the local code into synchrony with the code received from the satellite.

The two slaving loops, for code and carrier, take into account the Doppler frequency shift on the carrier frequency and on the code, which result from the relative motion of the aircraft and the detected satellite. This Doppler shift can be measured in the loops.

The GPS time and position calculations are performed on the basis of the status of the slaving loops at a determined measurement time. At this time, the exact status of the phase of the two oscillators with digital phase control are read.

The slaving loops provided in the receiver act to lock a local frequency onto the carrier frequency received from the satellites. The shift between this local frequency and the stable and known frequency transmitted by the satellites gives an indication of Doppler shift and therefore the difference between the velocity of the satellite and the velocity of the receiver along the axis joining the satellite to the receiver. As will be seen below, this Doppler indication needs to be corrected for the local clock frequency error of the receiver, which error can be measured by the temporal drift of the local clock relative to the GPS time.

The receiver therefore calculates, for the n different satellites observed at a given time (n greater than or equal to 4), its relative position with respect to these satellites. It deduces therefrom the directions of the observation axes of each of the satellites.

It moreover measures the pseudo-velocity, or relative velocity $PV_i$ between the receiver and the satellite of rank i, along the axis joining the receiver to the satellite of rank i (i varying from 1 to n). The absolute velocity of the satellite of rank i in the terrestrial frame is known. The receiver then calculates the satellite velocity projected onto the director axis of rank i: this is the velocity $Vrsat_i$. A clock drift correction $c.Dersat_i$ for the satellite can be calculated on the basis of the navigation data sent by the satellite; c is the velocity of light; $Dersat_i$ is the clock drift for the satellite of rank i, that is to say the variation, in the course of time, of the time bias of the clock of the satellite: the time bias of the clock of the satellite is the discrepancy between the time which this clock gives and the time defined on the ground for the entire GPS system. This bias can vary in the course of time because of frequency discrepancies of the clocks of the satellites relative to a theoretical value.

The receiver's absolute velocity, in the fixed terrestrial frame but projected onto the director axis of rank i, is deduced therefrom. Let $Vdop_i$ be this absolute velocity.

$$Vdop_i = PV_i + c.Dersat_i - Vrsat_i$$

Taken together, all the velocities $Vdop_i$ for i=1 to n form a measured absolute velocity vector VD which is an n×1 matrix of n individual velocities.

In a fixed three-dimensional terrestrial frame, the absolute velocity of the receiver could be expressed by an absolute velocity vector with three components V1, V2, V3. However, given the local clock drift of the receiver, which has a direct influence on the velocity measurement since the velocities are determined by the Doppler effect on the frequencies, it is preferable to express the absolute velocity of the receiver in a four-dimensional frame: three space dimensions in a fixed terrestrial frame and one time dimension in the form of a calculable velocity drift V4=c·Dhr, where Dhr is a variation in the clock bias of the receiver in the course of time. The clock bias of the receiver, which the GPS receiver itself can calculate so long as there are at least four observed satellites, is the discrepancy between the time given by the clock of the receiver and the time defined by the GPS system in its entirety. Dhr is the time variation of this bias. The velocity correction is the product of Dhr times the velocity of light c.

The absolute velocity of the receiver in the terrestrial frame can therefore be expressed in the form of a vector VABS with four components V1, V2, V3, V4, respectively representing the longitude, latitude and altitude velocities, and the correction due to the clock drift of the receiver.

The absolute velocities V1, V2, V3, V4 can be deduced from the velocity vector VD with n components.

If H denotes the (n×4) matrix of the director cosines, that is to say a matrix of n vectors (with four dimensions in the fixed terrestrial frame with one unitary time component) representing the directions of the director axes of rank i=1 to n, then the following equation should be satisfied:

$$VD = H \cdot VABS \qquad (1)$$

which means that the velocity measurements for the receiver along the director axes (which are considered to form a fixed frame) can be projected into the four-dimensional terrestrial frame to obtain a four-dimensional velocity vector uniquely.

The director cosine matrix is a matrix of n rows of four coefficients $C_{i,x}$, $C_{i,y}$, $C_{i,z}$, 1, where $C_{i,x}$, $C_{i,y}$, $C_{i,z}$ represent the cosines of the angles between the $i^{th}$ axis and the axes Ox, Oy, Oz (longitude, latitude, altitude) of the terrestrial frame, O being the position of the receiver.

In reality, because of the measurement noise, there is a discrepancy between VD and H·VABS, and the integrity of the velocity measurement using more than four satellites can be represented by a measurement of this discrepancy between VD and H·VABS.

If an optimization criterion is picked to find the vector VABS which is most representative of the velocity in the terrestrial frame on the basis of the vector VD, then VABS can be calculated. Mathematically, if a "least squares" criterion is adopted, the above matrix equation VD=H·VABS admits the following solution:

$$VABS=(H^T \cdot H)^{-1} \cdot H^T \cdot VD \quad (2)$$

$H^T$ is the transpose of H; it is a 4×n matrix.

The integrity of the calculation of the velocity can be evaluated quantitatively on the basis of the following value $\Delta V$, which will be referred to as the "calculation error residue":

$$\Delta V=(|VD-H \cdot VABS|)^2 \quad (3)$$

which is to say the residue $\Delta V$ is the norm of the difference vector between the measured velocity vector VD and the vector product H·VABS. It is moreover this quantity which is minimized when using the least squares criterion.

This residue at $\Delta V$ increases as the measurements taken by the n satellites coincide less. It is a measure of the divergence between the n measurements along the director axis.

If S denotes the n×n matrix equal to $I-H(H^T \cdot H)^{-1} \cdot H^T$, where I is the n×n matrix, then the following may be written on the basis of (2) and (3):

$$\Delta V=(|S \cdot VD|)^2 \quad (4)$$

With this assumption that the value representative of the velocity calculation integrity is the residue $\Delta V$ defined above, the invention essentially relies on calculating the norm of the vector S·VD on the basis of the director cosine matrix H and the individual velocity measurements on the n director axes, and comparing the result with a threshold to determine whether or not the measurement is acceptable. There is actually a risk of the threshold being exceeded whenever one satellite gives a measurement which is abnormal, that is to say deviates from the normal (Gaussian) statistical distribution of the measurement noise.

A threshold is therefore defined which is not to be exceeded for the norm of the vector product S·VD. An indication that it has been exceeded is given to the user in order to indicate to him that the velocity measurement is not reliable. Alternatively, the user is provided with a $\Delta V$ value indication, and therefore an indication of the quality of the measurement.

The integrity thresholds may, of course, vary from one application to another.

In practice, it will more often be a "normalized" residue which is calculated, that is to say one expressed in proportion to an estimated measurement noise $\sigma^2$. The normalized residue will be $\Delta V_{nr}=\Delta V/\sigma^2$. The way in which a noise value is determined in order to perform this calculation will be indicated below.

In this case, it can be shown that an acceptable threshold T can be picked for the normalized residue, this threshold depending essentially on a maximum probability of false alarm which will be selected and depends on the number n of satellites used.

An indication will be given below by way of example of a calculation method allowing a realistic alarm threshold T to be defined.

The following assumption is made in this example: the velocity measurement errors are statistically distributed according to Gaussian laws. It can then be demonstrated that the residue $\Delta V_{nr}$, which can be identified with a sum of squares of Gaussian random variables, follows a distribution law referred to as a $\chi^2$ law with n-4 degrees of freedom. The number of degrees of freedom is the number of satellites observed, n, less the number of satellites indispensable for the velocity measurement, here 4 if it is assumed that four satellites are necessary for giving a four-dimensional velocity vector.

In the case of such a Gaussian probability law, it is known to calculate a probability of false alarm PFA, that is to say the probability that the residue $\Delta V_{nr}$ will be greater than the threshold T even though there is no velocity calculation error. The probability of false alarm is:

$$PFA=Q(T|n-4) \quad (5)$$

where Q is a probability law with n-4 degrees of freedom which is deduced from the $\chi^2$ probability law P with n-4 degrees of freedom by the formula Q=1−P. The probability law P will be expressed by the following symbolic representation: $P(\chi^2|n-4)$
which gives, with the same notation $$Q(\chi^2|n-4)=1-P(\chi^2|n-4) \quad (6)$$

If the curves representing the $\chi^2$ probability laws as a function of T for each value n are plotted, and if a given probability PFA (of false alarm) is picked, a respective threshold value T will be found for each value of n which is the abscissa of the curve corresponding to the value of n, for an ordinate equal to PFA. These thresholds are collated in a table and will be the thresholds used for the integrity check.

Mathematically, it may be assumed that, for a given probability of false alarm PFA, the following threshold T is calculated:

$$T=Q^{-1}(PFA) \quad (7)$$

$Q^{-1}$ is the inverse function of $Q(\chi^2|n-4)$, that is to say if $Q(x)=a$, then $x=Q^{-1}(a)$.

By way of example, having plotted the $\chi^2$ probability curves, the thresholds were calculated for an arbitrarily selected (but realistic) probability of false alarm of $10^{-3}$. The normalized values of the threshold T for a number n of satellites of between 5 and 10 are then the following (approximately):

| n = | 5 | 6 | 7 | 8 | 9 | 10 |
|-----|---|---|---|---|---|----|
| T = | 10 | 14 | 16 | 18 | 20 | 22 |

The thresholds T which are thus calculated will therefore be used according to the invention: when, in a velocity measurement, the matrix H, then the matrix S, then the norm $\Delta V_{nr}$ of the vector product S·VD are calculated, this norm will be compared with the threshold T (selected as a function of the number of satellites used, from a table containing one threshold value for each value of n).

The calculations which make it possible to determine the divergence $\Delta V_{nr}$ require an estimate of the velocity measurement noise. In general, these parameters are predetermined on the basis of statistical measurements. A realistic value for σ is 0.2 m/s. In the GPS system, this noise actually results principally from selective availability, which is a variation in clock frequency of the satellites introduced to intentionally degrade the position precision that can be obtained.

However, an estimate of the measurement noise can be obtained by a statistical calculation on the basis of the velocity error residues ΔV, because it can be demonstrated that the mathematical expectancy of the velocity error residue has a value $(n-4)\sigma^2$, n-4 being the number of degrees of freedom of the velocity resolution, and σ being the velocity measurement noise. Following a certain number of measurements, it is therefore possible to calculate measurement noise statistics, and these statistics are used to calculate the normalized residue $\Delta V_{nr}$.

The simplest case is to calculate ΔV every 200 ms, for example (the delivery rate of the velocity measurements) then to calculate a moving average of the terms ΔV/n-4 every few minutes, and this average represents the estimate of the square of the measurement noise. It naturally assumes integrity of the system. Initially, the value of σ can be arbitrarily fixed, for example at 0.2 m/s, before a moving average value is available.

Besides the indication of the lack of integrity in the velocity measurement ($\Delta V_{nr}$ exceeds the threshold T), an indication of the quality of the integrity monitoring performed may also be provided.

It is actually not sufficient to confirm the measurement's integrity with a determined probability of false alarm. It would be better to know as well what the probability of non-detection of a velocity error is.

This is why it is proposed, according to the invention, to fix a maximum probability of non-detection which can be tolerated in the receiver, and to deduce therefrom what is the velocity error limit which results therefrom and beyond which the measurement will be considered as unreliable.

For example, a maximum probability of non-detection of $10^{-2}$ is picked, that is to say at most one chance in 100 that the system will not see a velocity error is tolerated, and this velocity error which gives rise to one chance in 100 of not being detected is calculated.

When such a PND probability is picked, a geometrical parameter Θ may be calculated which will itself be used to calculate a check indicator of the quality of the integrity surveillance performed.

The following assumption may be made: it is assumed that the velocity error is due to a velocity bias on one of the satellites (for example resulting from an error in its clock), and that the distribution of this velocity bias is Gaussian; it can be demonstrated that the residue ΔVhd nrfollows an uncentred $\chi^2$ distribution law with n-4 degrees of freedom, of parameter Θ proportional to the bias, with n-4 degrees of freedom. The parameter Θ of the uncentred probability law $P'(\chi^2|n-4, \Theta)$ is then:

$$\Theta = (B^2/\sigma^2)S_{i,i} \qquad (8)$$

B is the velocity bias;

σ is the estimate of the measurement noise standard deviation for the velocity;

$S_{i,i}$ is the sensitivity to velocity errors along the axis i: measurement of the error generated on the axis i by a bias on the axis i itself. This is the element of rank i,i of the matrix S mentioned above with reference to equation (4).

Under these conditions, there is a probability of non-detection, that is to say a probability that the velocity residue $\Delta V_{nr}$ will be less than the threshold T (fixed beforehand as a function of PFA and of n) even though there is actually a velocity calculation error due to a bias on one of the satellites.

The curves representing this probability of non-detection as a function of Θ for various possible values of n can be plotted. If a probability of non-detection is then fixed, a table of values of Θ for various values of n is obtained. For example, if PND=$10^2$ is picked, the following table is obtained (approximate values) for n lying between 5 and 10 satellites:

| n | 5 | 6 | 7 | 8 | 9 | 10 |
|---|---|---|---|---|---|----|
| Θ | 31.5 | 35 | 38 | 40 | 42 | 45 |

Now, it can be shown that Θ is also equal to $(RPE/\sigma\Delta H_i)^2$, where RPE is the velocity radius of protection, that is to say the velocity error for which the probability of non-detection is equal to PND, $\Delta H_i$ is a difference between two values of "dilution of precision" XDOP which are linked with the satellite constellation used; more precisely, it is the difference between the dilution of precision XDOP of the full constellation of n satellites, and the dilution of precision XDOP of the constellation of n-1 satellites excluding the axis i. The dilution of precision XDOP is derived from the matrix $H^T \cdot H^{-1}$ (4×4 matrix). It is the square root of the sum of the terms on the diagonal of the matrix.

If it is primarily the horizontal velocity which is of interest, it will instead be the horizontal dilution of precision HDOP that is used, which is the square root of the sum of the first two terms on the diagonal. If only the vertical velocity is of interest, only the third term on the diagonal will be taken (VDOP).

The term XDOP or HDOP or VDOP represents the quality of the constellation of satellites at the time of the measurement, and does not have the same value according to whether all the satellites or all the satellites except the satellite of rank i are taken. $\Delta H_i$ represents the difference in XDOP or HDOP or VDOP calculated in the two cases.

The result of all this is that, if a probability of non-detection PND is picked, the values of geometrical criteria Θ which link the radius of protection and the $\Delta H_i$ can be deduced therefrom. Then, as a function of these values of Θ and the status of the satellite constellation observed at a given time, it is possible to calculate the radius of protection for the velocity calculation integrity surveillance: this radius RPE is the maximum value found for the product of the following three values:

the square root of Θ, $\Delta H_i$,

σ.

This product is calculated for all the satellites i from 1 to n, and the maximum value found represents the radius of protection RPE.

$$RPE = max(\Theta^{1/2} \cdot \Delta H_i \cdot \sigma) \text{ for } i=1 \text{ to } n$$

This radius of protection RPE, or velocity error limit for a given probability of non-detection, is expressed in velocity units (for example m/s) and can be displayed for the user or give rise to an alarm if it exceeds a predetermined value. The alarm may be an indication of "unreliable velocity measurement".

The invention therefore makes it possible to give both an alarm in case of insufficient integrity in the velocity measurement on more than four satellites and a value of velocity radius of protection.

When insufficient integrity is observed, it is desirable to at least temporarily suppress the data from the satellite which is causing the integrity loss. To do this, it is necessary to determine which this satellite is.

To do this, the velocity error residue is calculated for all the groups of n-1 satellites, and the satellite rank i, for which the residue resulting from the n-1 other satellites does not cause the integrity threshold to be exceeded whereas the residue for n satellites causes it to be exceeded, is determined.

Once the satellite which has caused the error has been identified, the data from this satellite are suppressed.

What is claimed is:

1. Satellite positioning receiver, comprising position calculation means which simultaneously use a number of n satellites at least equal to 4, receiver velocity calculation means which determine the velocity of the receiver along the director axes joining the receiver to each of the n satellites, and means for calculating a velocity vector of the receiver in a fixed terrestrial frame on the basis of the velocities along the director axes and on the basis of a matrix of vectors representing the directions of these director axes in the fixed frame, this receiver being characterized in that it furthermore comprises means for calculating a value representative of the divergence between the velocity measurements and the n director axes, this value representing information about the validity of the velocity vector of the receiver in the fixed frame.

2. Receiver according to claim 1, characterized in that it comprises means for calculating a velocity radius of protection for a given non-detection probability, on the basis of the formula RPE=max ($\Theta^{1/2} \cdot \Delta H_i \cdot \sigma$) for i=1 to n, where σ is an estimated velocity measurement noise value, Θ is a parameter selected as a function of number n from a table containing a respective numerical value for various possible values of n, and $\Delta H_i$ is the difference between the value of the parameter PDOP, which is the position dilution of precision, for the constellation of n satellites and the value of this same parameter for the constellation of n-1 satellites from which the first satellite has been excluded.

3. Receiver according to claim 1, characterized in that it comprises means for giving an alarm signal if the divergence measurement exceeds a determined threshold.

4. Receiver according to claim 3, characterized in that it comprises means for calculating a velocity radius of protection for a given non-detection probability, on the basis of the formula RPE=max ($\Theta^{1/2} \cdot \Delta H_i \cdot \sigma$) for i=1 to n, where σ is an estimated velocity measurement noise value, Θ is a parameter selected as a function of number n from a table containing a respective numerical value for various possible values of n, and $\Delta H_i$ is the difference between the value of the parameter PDOP, which is the position dilution of precision, for the constellation of n satellites and the value of this same parameter for the constellation of n-1 satellites from which the first satellite has been executed.

5. Receiver according to claim 3, characterized in that the threshold is selected from a table containing one threshold value for each number n of satellites.

6. Receiver according to claim 5, characterized in that it comprises means for calculating a velocity radius of protection for a given non-detection probability, on the basis of the formula RPE=max ($\Theta^{1/2} \cdot \Delta H_i \cdot \sigma$) for i=1 to n, where σ is an estimated velocity measurement noise value, Θ is a parameter selected as a function of number n from a table containing a respective numerical value for various possible values of n, and $\Delta H_i$ is the difference between the value of the parameter PDOP, which is the position dilution of precision, for the constellation of n satellites and the value of this same parameter for the constellation of n-1 satellites from which the first satellite has been executed.

7. Satellite positioning receiver according to claim 1, characterized in that the means for calculating the divergence value comprise means for calculating a residual velocity error $\Delta V$ equal to the norm $\Delta V = (|S \cdot VD|)^2$ of a vector product S·VD, where S is an n×n matrix, n being the number of satellites used, and VD is a measured velocity vector whose components are the n velocity measurements along the director axes between the receiver and each of the n satellites, the matrix S being calculated on the basis of the following formula, where H is the one n×4 matrix of the director cosines of these axes in a fixed terrestrial spatio-temporal frame, $H^T$ is the transpose of this matrix H, and I is the n×n identity matrix: $S = I - H(H^T \cdot H)^{-1} \cdot H^T$.

8. Receiver according to claim 7, characterized in that it comprises means for giving an alarm signal if the divergence measurement exceeds a determined threshold.

9. Receiver according to claim 7, characterized in that it comprises means for calculating a velocity radius of protection for a given non-detection probability, on the basis of the formula RPE=max ($\Theta^{1/2} \times \Delta H_i \times \sigma$) for i=1 to n, where σ is an estimated velocity measurement noise value, Θ is a parameter selected as a function of number n from a table containing a respective numerical value for various possible values of n, and $\Delta H_i$ is the difference between the value of the parameter PDOP, which is the position dilution of precision, for the constellation of n satellites and the value of this same parameter for the constellation of n-1 satellites from which the first satellite has been executed.

10. Receiver according to claim 7, characterized in that the means for calculating the divergence comprise means for calculating a normalized residue $\Delta V_{nr}$ equal to $\Delta V/\sigma^2$, where $\sigma$ is an estimated velocity measurement noise.

11. Receiver according to claim 10, characterized in that it comprises means for calculating a velocity radius of protection for a given non-detection probability, on the basis of the formula RPE=max ($\Theta^{1/2} \cdot \Delta H_i \cdot \sigma$) for i=1 to n, where $\sigma$ is an estimated velocity measurement noise value, $\Theta$ is a parameter selected as a function of number n from a table containing a respective numerical value for various possible values of n, and $\Delta H_i$ is the difference between the value of the parameter PDOP, which is the position dilution of precision, for the constellation of n satellites and the value of this same parameter for the constellation of n-1 satellites from which the first satellite has been executed.

12. Receiver according to claim 10, characterized in that the square of the velocity measurement noise is estimated on the basis of means for calculating a moving average, over several successive measurements, of $\Delta V/n-4$.

13. Receiver according to claim 12, characterized in that it comprises means for calculating a velocity radius of protection for a given non-detection probability, on the basis of the formula RPE=max ($\Theta^{1/2} \cdot \Delta H_i \cdot \sigma$) for i=1 to n, where $\sigma$ is an estimated velocity measurement noise value, $\Theta$ is a parameter selected as a function of number n from a table containing a respective numerical value for various possible values of n, and $\Delta H_i$ is the difference between the value of the parameter PDOP, which is the position dilution of precision, for the constellation of n satellites and the value of this same parameter for the constellation of n-1 satellites from which the first satellite has been executed.

\* \* \* \* \*